J. HOLLANDER.
DOUGH RAISING MACHINE.
APPLICATION FILED SEPT. 7, 1910.
992,501.
Patented May 16, 1911.
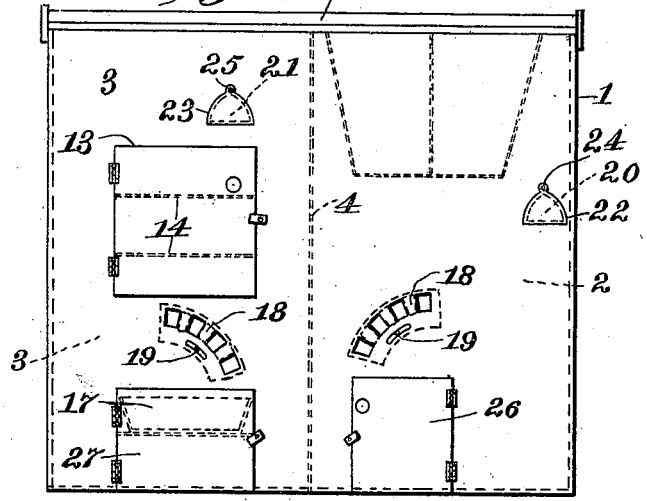
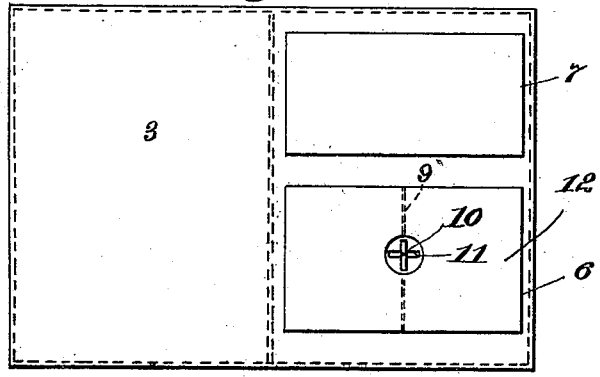
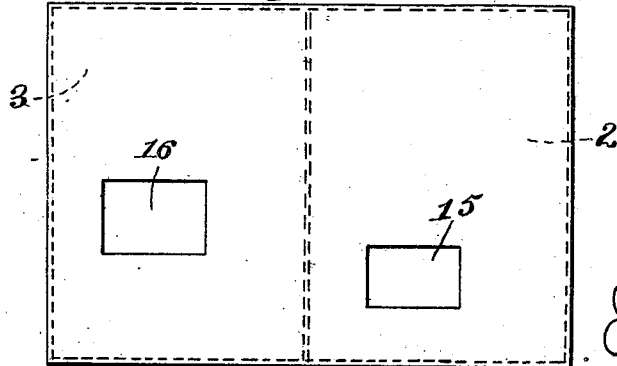
Witnesses
Wm. T. Davidson
E. J. James
Inventor
John Hollander
By Frank C. Gore
Attorney

UNITED STATES PATENT OFFICE.

JOHN HOLLANDER, OF EVANSVILLE, INDIANA.

DOUGH-RAISING MACHINE.

992,501. Specification of Letters Patent. Patented May 16, 1911.

Application filed September 7, 1910. Serial No. 580,887.

*To all whom it may concern:*

Be it known that I, JOHN HOLLANDER, a citizen of the United States, residing at Evansville, in the county of Vanderburg and State of Indiana, have invented new and useful Improvements in Dough-Raising Machines, of which the following is a specification.

This invention relates to bread making machines and has for its objects to provide an auxiliary oven in which dough may be conveniently kept in proper condition for baking irrespective of changes in temperature due to varying weather conditions.

A further object is to provide a device which in addition to fulfilling the above object is also adapted to be used as a kitchen table or bread board and with slight alteration as a kitchen cabinet.

Further objects and advantages of the invention will be set forth in the detail description which now follows.

In the accompanying drawing, Figure 1 is a front elevation of my improved apparatus, Fig. 2 is a top plan view, Fig. 3 is a bottom view and Fig. 4 is a detail view of the improved fastener for the dough receptacle.

Like numerals designate corresponding parts in all the figures of the drawings.

Referring to the drawings, 1 designates a cabinet preferably formed of wood and of rectangular shape, divided into two compartments 2 and 3 by the division wall 4. A detachable top 5 is provided which is reversible and may if desired be used as a kitchen table or a bread board.

Within the compartment 2 are located adjacent to each other a dough trough 6 and a flour receptacle 7. The dough trough in which the dough is mixed is removably supported within the cabinet 1 in any suitable manner and a division wall 9 provides accommodation for different kinds of dough.

Rotatably mounted upon the upper edge of the wall 9 is a headed projection 10 adapted to pass through the elongated slot 11 in the cover 12 of the dough trough. It will readily be seen that when the headed projection is turned at right angles to the length of the slot 11, the cover 12 will be securely locked in place.

The compartment 3 contains a vapor box 13 of any desired dimensions and provided with shelves 14 to receive the dough for proofing after the same has been molded in suitable pans. Heat is supplied by means of suitable gas or other burners (not shown) inserted in the openings 15—16 located respectively in the bottom of the compartments 2 and 3, and directly above the burner or heater and below the vapor box 13 is a water trough or receptacle 17 for a purpose hereinafter specified.

Means for regulating the supply of heat to the dough trough and vapor box are provided consisting of a series of superimposed slats 18 arranged above the burners in compartments 2 and 3 and adapted to be opened and closed by sliding the projection 19 as clearly shown in the drawings.

Troughs 20 and 21 located respectively adjacent to the dough trough and vapor box are adapted to contain thermometers to indicate the temperatures in their respective compartment. Doors 22 and 23 pivoted at 24 and 25 permit access to the thermometers and doors 26 and 27 open into the cabinet beneath the heat regulating means.

As hereinbefore stated, a water trough or pan 17 is provided beneath the vapor box 13. By this means the dough in the vapor box is not only kept at the desired temperature by the heat from the burner in compartment 3, but the water in the pan 17 gives off sufficient vapor to keep the molded dough moist, which has been found to be most desirable.

Having described my invention what I claim is:

A dough raising machine comprising a substantially rectangular cabinet divided into two main compartments, a dough mixing trough and a flour receptacle in one of said compartments, a dough proofing receptacle in the other of said compartments, means for heating and supplying vapor to said dough proofing receptacle, separate heating means for the dough mixing receptacle, and separate heat regulating means for said dough proofing receptacle and said dough mixing receptacle.

In testimony whereof I have hereunto set my hand in presence of two subscribing witnesses.

JOHN HOLLANDER.

Witnesses:
  F. C. GORE,
  JETTINA RICKETTS.

---

Copies of this patent may be obtained for five cents each, by addressing the "Commissioner of Patents, Washington, D. C."